US010293494B2

United States Patent
Fukada

(10) Patent No.: US 10,293,494 B2
(45) Date of Patent: May 21, 2019

(54) BULK WORKPIECE PICKING SYSTEM AND METHOD

(71) Applicant: FANUC CORPORATION, Yamanashi (JP)

(72) Inventor: Tetsuo Fukada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 173 days.

(21) Appl. No.: 15/432,096

(22) Filed: Feb. 14, 2017

(65) Prior Publication Data

US 2017/0252929 A1    Sep. 7, 2017

(30) Foreign Application Priority Data

Mar. 3, 2016    (JP) .................................. 2016-041445

(51) Int. Cl.
*B25J 15/06*    (2006.01)
*B25J 9/16*    (2006.01)

(52) U.S. Cl.
CPC ......... *B25J 15/0608* (2013.01); *B25J 9/1612* (2013.01); *G05B 2219/39567* (2013.01); *G05B 2219/40053* (2013.01); *Y10S 901/40* (2013.01)

(58) Field of Classification Search
CPC ................ B25J 15/0608; B25J 9/1612; G05B 2219/39567; G05B 2219/40053; Y10S 901/40
See application file for complete search history.

(56) References Cited

U.S. PATENT DOCUMENTS 8,702,078 B2 *    4/2014    Clifford ............... B25J 15/0608
                                                                    269/8
2008/0034920 A1    2/2008    Inoue et al.
(Continued)

FOREIGN PATENT DOCUMENTS

CN        101618544 A        1/2010
CN        104608149 A        5/2015
(Continued)

OTHER PUBLICATIONS

English Translatation for reference JP2001239489, dated Apr. 9, 2001.*
(Continued)

*Primary Examiner* — Rachid Bendidi
(74) *Attorney, Agent, or Firm* — Maier & Maier, PLLC

(57) ABSTRACT

A bulk workpiece picking system is configured by including: a robot which is provided with an electromagnetic hand capable of magnetically attracting a metal workpiece; a determination section which determines whether or not the workpiece is magnetically attracted by the electromagnetic hand; and a magnetic force control section which controls the magnetic force of the electromagnetic hand, the magnetic force control section being configured such that: before it is determined by the determination section that the magnetic attraction is performed; the magnetic force control section sets a magnitude of the magnetic force of the electromagnetic hand so that the electromagnetic hand can suspend one workpiece and cannot suspend two workpieces; and then, after it is determined by the determination section that the magnetic attraction is performed, the magnetic force control section increases the magnetic force of the electromagnetic hand.

4 Claims, 9 Drawing Sheets

(56) References Cited

U.S. PATENT DOCUMENTS

| | | | | |
|---|---|---|---|---|
| 2010/0004778 A1* | 1/2010 | Arimatsu | ............... | B25J 9/1697 |
| | | | | 700/214 |
| 2012/0034022 A1 | 2/2012 | Long | | |
| 2013/0085605 A1* | 4/2013 | Yasuda | ................ | B25J 9/1687 |
| | | | | 700/259 |
| 2015/0124057 A1 | 5/2015 | Yamazaki | | |

FOREIGN PATENT DOCUMENTS

| | | |
|---|---|---|
| EP | 1 886 773 A1 | 2/2008 |
| JP | H06-254787 | 9/1994 |
| JP | H07-218583 | 8/1995 |
| JP | H08-243961 A | 9/1996 |
| JP | H11-162736 A | 6/1999 |
| JP | 2001-239489 | 9/2001 |
| JP | 2002-210685 | 7/2002 |
| JP | 2010-269400 A | 12/2010 |
| JP | 2012-183593 A | 9/2012 |
| JP | 2014-237206 A | 12/2014 |
| JP | 2015-127252 A | 7/2015 |

OTHER PUBLICATIONS

Japanese Office Action dated Feb. 27, 2018, in connection with corresponding JP Application No. 2016-058595 (4 pgs., including English translation).

Japanese Office Action dated Feb. 20, 2018, in connection with corresponding JP Application No. 2016-041445 (7 pgs., including English translation).

Office Action dated Jan. 25, 2019, in corresponding Chinese Application No. 201710072144.1; 15 pgs.

\* cited by examiner

BULK WORKPIECE PICKING SYSTEM AND METHOD

CROSS-REFERENCE TO RELATED APPLICATIONS

This application claims the benefit of Japanese Patent Application No. 2016-041445, the content of which is incorporated herein by reference.

Technical Field

The present invention relates to a bulk workpiece picking system and method.

Background Art

Conventionally, there is known a robot system for picking up, by using an electromagnetic hand, a workpiece from a plurality of metal workpieces placed in bulk (see, for example, PTL 1).

CITATION LIST

Patent Literature

{PTL 1} Japanese Unexamined Patent Application, Publication No. 2012-183593

SUMMARY OF INVENTION

An aspect of the present invention provides a bulk workpiece picking system including: a robot which is provided with an electromagnetic hand capable of magnetically attracting a metal workpiece; a determination section which determines whether or not the workpiece is magnetically attracted to the electromagnetic hand; and a magnetic force control section which controls the magnetic force of the electromagnetic hand, the magnetic force control section being configured such that, before it is determined by the determination section that the magnetic attraction is performed, the magnetic force control section sets a magnitude of the magnetic force of the electromagnetic hand so that the electromagnetic hand can suspend one workpiece and cannot suspend two workpieces, and then, after it is determined by the determination section that the magnetic attraction is performed, the magnetic force control section increases the magnetic force of the electromagnetic hand.

Further, according to another aspect of the present invention, a bulk workpiece picking system is configured by including: a robot which is provided with an electromagnetic hand capable of magnetically attracting a metal workpiece; a buffer stage which is arranged in an operation range of the robot; a determination section which determines whether or not two or more workpieces are magnetically attracted to the electromagnetic hand; and a control section which controls the robot, and is configured such that, when it is determined by the determination section that two or more workpieces are magnetically attracted to the electromagnetic hand, the control section controls the robot so that the workpieces are arranged above the buffer stage, and then, the control section reduces the magnetic force of the electromagnetic hand to lower the workpieces toward the buffer stage.

Further, another aspect of the present invention provides a picking method for taking out, by magnetic attraction, a single workpiece from a plurality of metal workpieces placed in bulk, the picking method including: a first magnetic force setting step of setting a magnitude of magnetic force of an electromagnetic hand so that the electromagnetic hand can suspend one workpiece and cannot suspend two workpieces; an attraction step of magnetically attracting the workpiece to the electromagnetic hand which generates the magnetic force set in the first magnetic force setting step; a determination step of determining whether or not the workpiece is magnetically attracted to the electromagnetic hand successfully by the attraction step; and a second magnetic force setting step of increasing the magnetic force of the electromagnetic hand when it is determined by the determination step that the workpiece is magnetically attracted to the electromagnetic hand.

DESCRIPTION OF EMBODIMENTS

In the following, a picking system 1 and a picking method of workpieces placed in bulk according to an embodiment of the present invention will be described with reference to the accompanying drawings.

Figure 1:
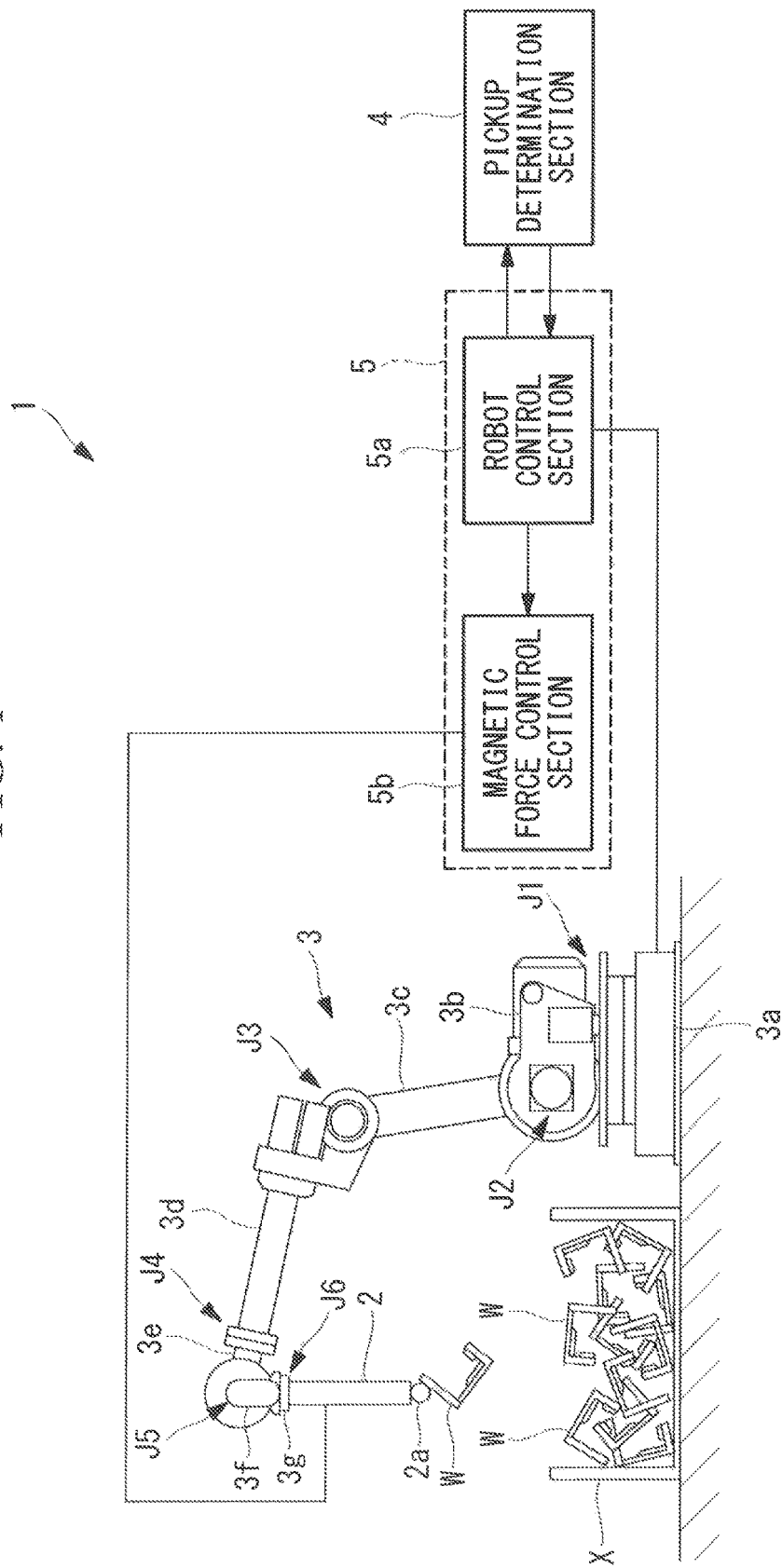
FIG. 1 is a view showing an entire configuration of a picking system according to an embodiment of the present invention.

As shown in FIG. 1, the picking system 1 according to the present embodiment includes: a robot 3 which is provided with an electromagnetic hand 2 capable of magnetically attracting a metal workpiece W; a pickup determination section (determination section) 4 which determines whether or not the workpiece W is magnetically attracted to the electromagnetic hand 2; and a control section 5 which controls the operation of the robot 3, and the magnetic force of the electromagnetic hand 2.

The robot 3 is, for example, a multi-joined manipulator including: a first axis J1 which is a vertical axis and about which a body section 3b is turned with respect to a base 3a fixed to the floor surface; a second axis J2 which is a horizontal axis and about which a first arm 3c is swung with respect to the body section 3b; a third axis J3 which is a horizontal axis and about which a second arm 3d is swung with respect to the first arm 3c; a fourth axis J4 which is a longitudinal axis of the second arms 3d and about which a wrist base 3e is rotated with respect to the second arm 3d; a fifth axis J5 which is an axial orthogonal to the longitudinal axis of the second arm 3d and about which a wrist section 3f is swung with respect to the wrist base 3e; and a sixth axis J6 which is an axial orthogonal to the fifth axis J5 and about which a wrist distal end section 3g is rotated. The electromagnetic hand 2, whose elongated rod-like distal end is provided with a magnetic attraction section 2a, is fixed to the wrist distal end section 3g.

As shown in FIG. 1, a plurality of the workpieces W are randomly housed in bulk, for example, in a mesh cage X.

Figure 2:
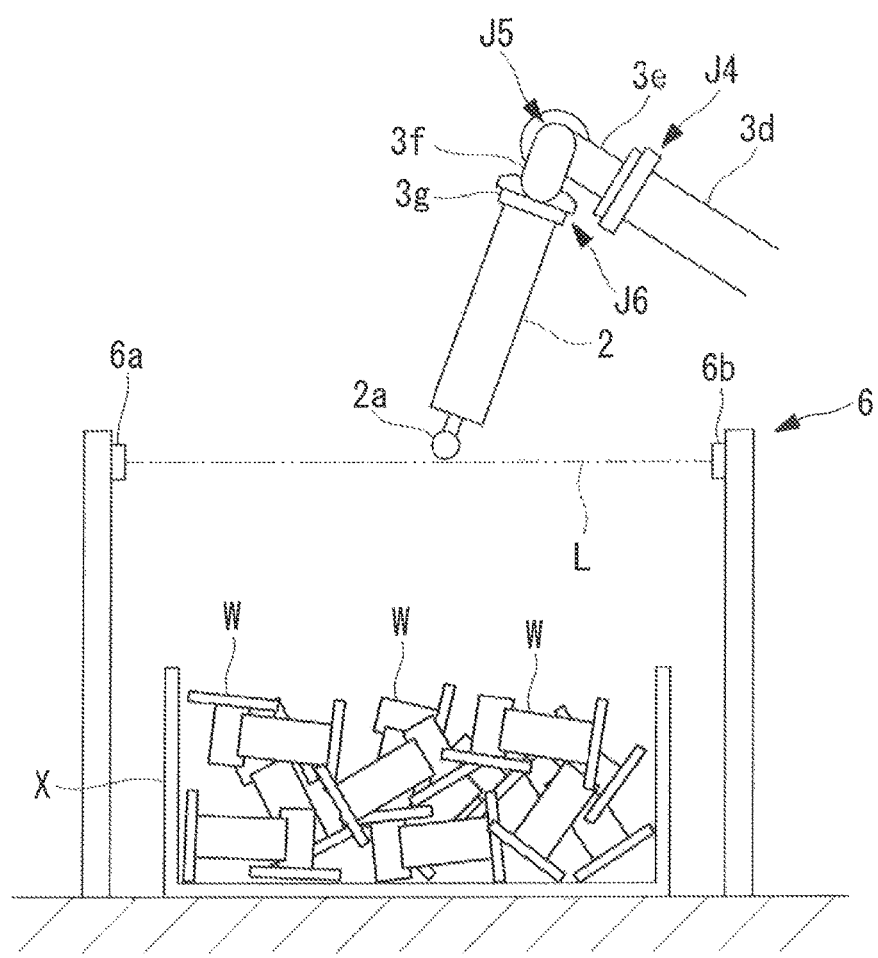
FIG. 2 is a view for explaining an operation of a determining section in the picking system of FIG. 1.

As shown in FIG. 2, the pickup determination section 4 is provided with a sensor 6 which is arranged at an upper portion of the mesh cage X. The sensor 6 includes a light-emitting section 6a and a light-receiving section 6b which are arranged to face each other with a space therebetween. The sensor 6 is configured to detect that, when light emitted by the light-emitting section 6a is received by the light-receiving section 6b, no object exists between the light-emitting section 6a and the light-receiving section 6b, and is configured to detect that, when light emitted by the light-emitting section 6a is not received by the light-receiving section 6b, an object exists between the light-emitting section 6a and the light-receiving section 6b.

The robot 3 arranges the magnetic attraction section 2a of the electromagnetic hand 2 at a pickup determination position which is located slightly above the light beam L emitted from the sensor 6 as shown in FIG. 2. In this state, when the sensor 6 detects the existence of an object, the pickup determination section 4 determines that the workpiece W is successfully suspended, while when the sensor 6 does not detect the existence of an object, the pickup determination section 4 determines that the workpiece W is not successfully suspended.

The control section 5 includes a robot control section 5a which controls the operation of the robot 3, and a magnetic force control section 5b which controls the magnetic force of the electromagnetic hand 2.

According to a stored program, the robot control section 5a supplies electric current to the motor (not shown) of each of the axes J1, J2, J3, J4, J5 and J6 of the robot 3, to operate each of the axes J1, J2, J3, J4, J5 and J6.

Figure 3:
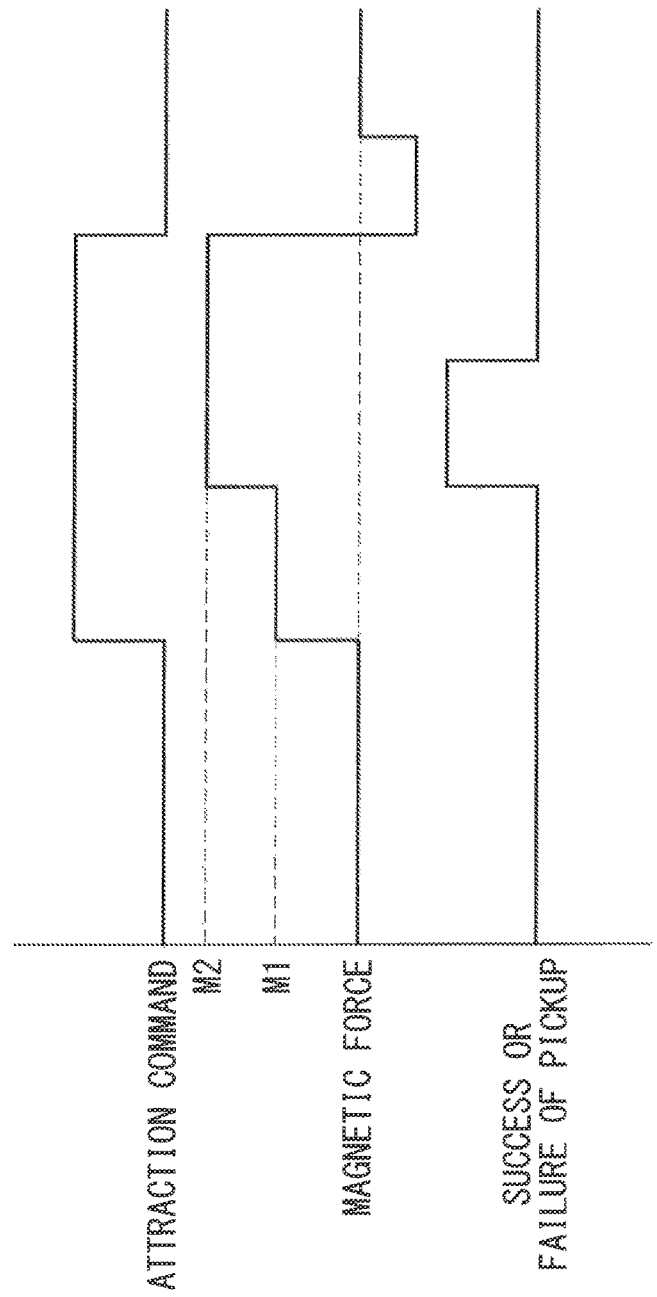
FIG. 3 is a view showing a relationship among an attraction command signal, a pickup success/failure determination signal, and the magnetic force of the electromagnetic hand in the picking system of FIG. 1.

The magnetic force control section 5b controls generation or non-generation of magnetic force of the electromagnetic hand 2 according to an attraction command signal outputted from the robot 3, and the signal from the pickup determination section 4. As shown in FIG. 3, when receiving the attraction command signal from the robot 3, the magnetic force control section 5b controls the magnetic attraction section 2a of the electromagnetic hand 2 so that the magnetic attraction section 2a generates first magnetic force M1, by which one workpiece W can be suspended and two workpieces W cannot be suspended.

Further, when receiving, from the pickup determination section 4, the determination result that the workpiece W is successfully suspended, the magnetic force control section 5b controls the magnetic attraction section 2a of the electromagnetic hand 2 so that the magnetic attraction section 2a generates second magnetic force M2 larger than the first magnetic force M1.

Further, when the reception of the attraction command signal of the workpiece W from the robot control section 5a is ended, the magnetic force control section 5b stops the generation of the magnetic force, so that the workpiece W is detached from the electromagnetic hand 2.

A picking method, using the bulk workpiece picking system 1 according to the present embodiment as described above, will be described as follows.

Figure 4:
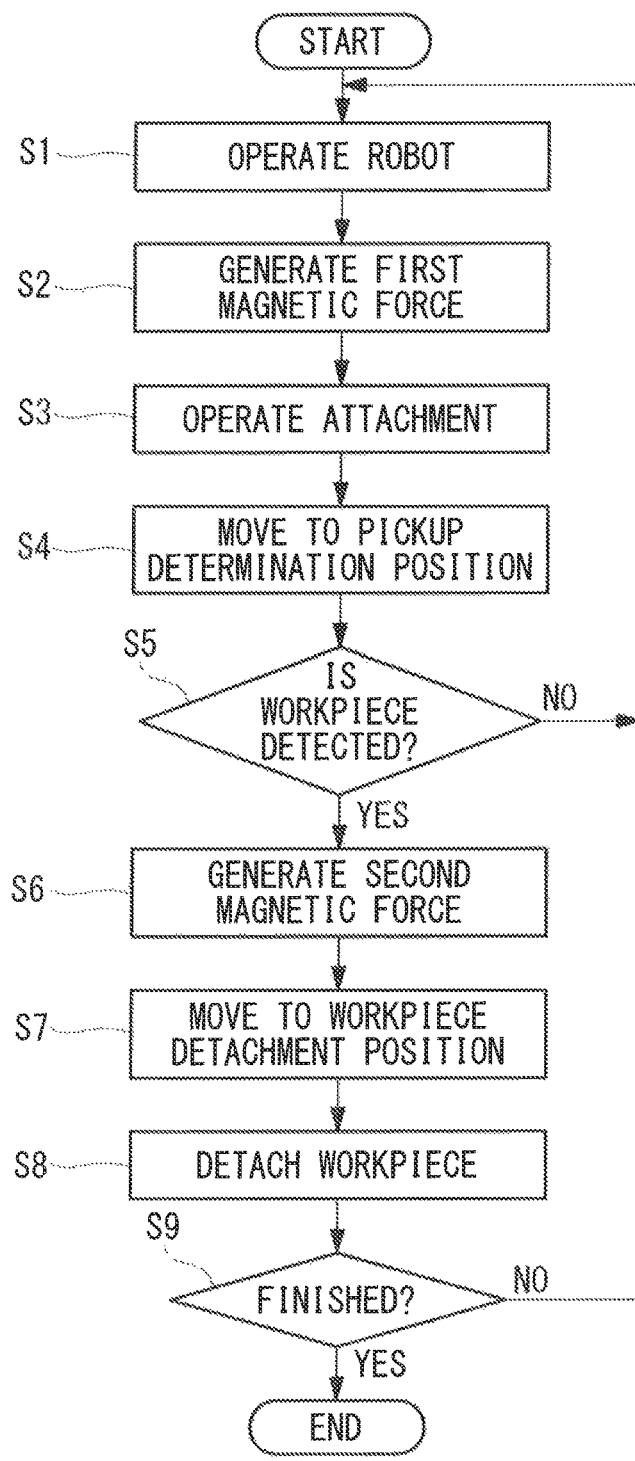
FIG. 4 is a flowchart explaining the picking method according to an embodiment of the present invention.

As shown in FIG. 4, in the bulk workpiece picking method according to the present embodiment, first, the robot control section 5a detects the attraction position of a target workpiece by using a bulk sensor 8 (see FIG. 10) which is operated by an additional axis motor of the robot 3, and then, the robot control section 5a operates the robot 3 so that the magnetic attraction section 2a of the electromagnetic hand 2 becomes close to the bulk workpieces W in the mesh cage X (step S1).

After the magnetic attraction section 2a is arranged in the vicinity of the attraction position of the workpiece W, the first magnetic force M1 is generated by the magnetic force control section 5b (first magnetic force setting step S2). Further, the robot control section 5a performs the attraction operation in which the workpiece W is attracted to the magnetic attraction section 2a of the electromagnetic hand 2. That is, the robot control section 5a performs, for example, the operation in which the magnetic attraction section 2a of the electromagnetic hand 2 is moved into a predetermined range in the mesh cage X (attraction step S3).

After the attraction operation by the robot 3 is ended, the robot control section 5a operates the robot 3 so that the magnetic attraction section 2a of the electromagnetic hand 2 is moved to the pickup determination position as shown in FIG. 2 (step S4).

Figure 5:
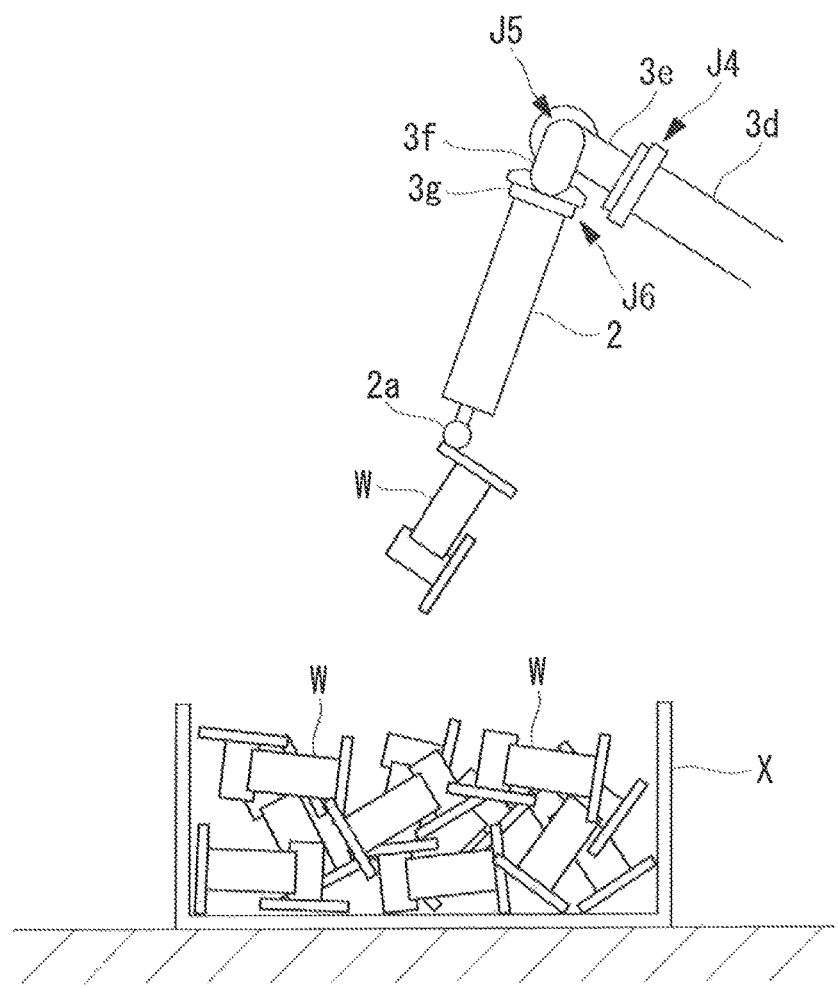
FIG. 5 is a view showing a state in which one workpiece is picked up by the electromagnetic hand in the picking system of FIG. 1.

The pickup determination position, at which one workpiece W is magnetically attracted to the magnetic attraction section 2a, is the position at which the one workpiece W is suspended away from the other workpieces W in the mesh cage X as shown in FIG. 5. Therefore, at this position, it is possible to determine whether or not the workpiece W is magnetically attracted to the magnetic attraction section 2a, and thereby, it is possible to determine whether or not the magnetic attraction of one single workpiece W is successfully performed.

Figure 6:
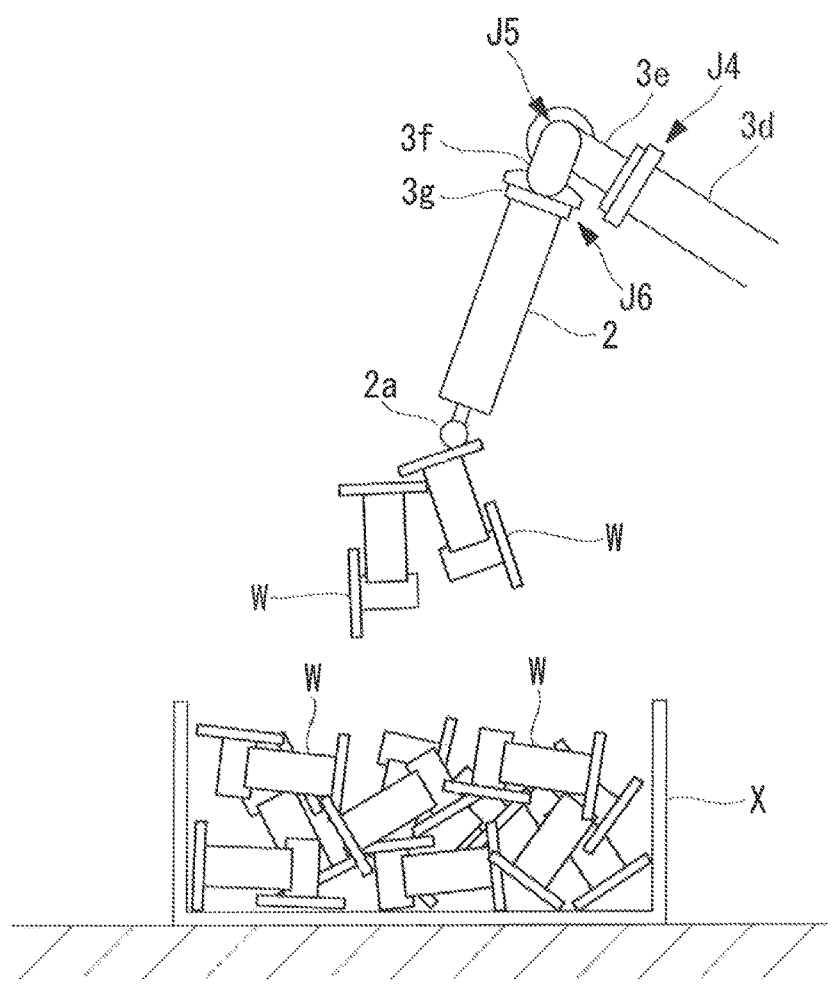
FIG. 6 is a view showing a state in which two workpieces are picked up by the electromagnetic hand.
Figure 7:
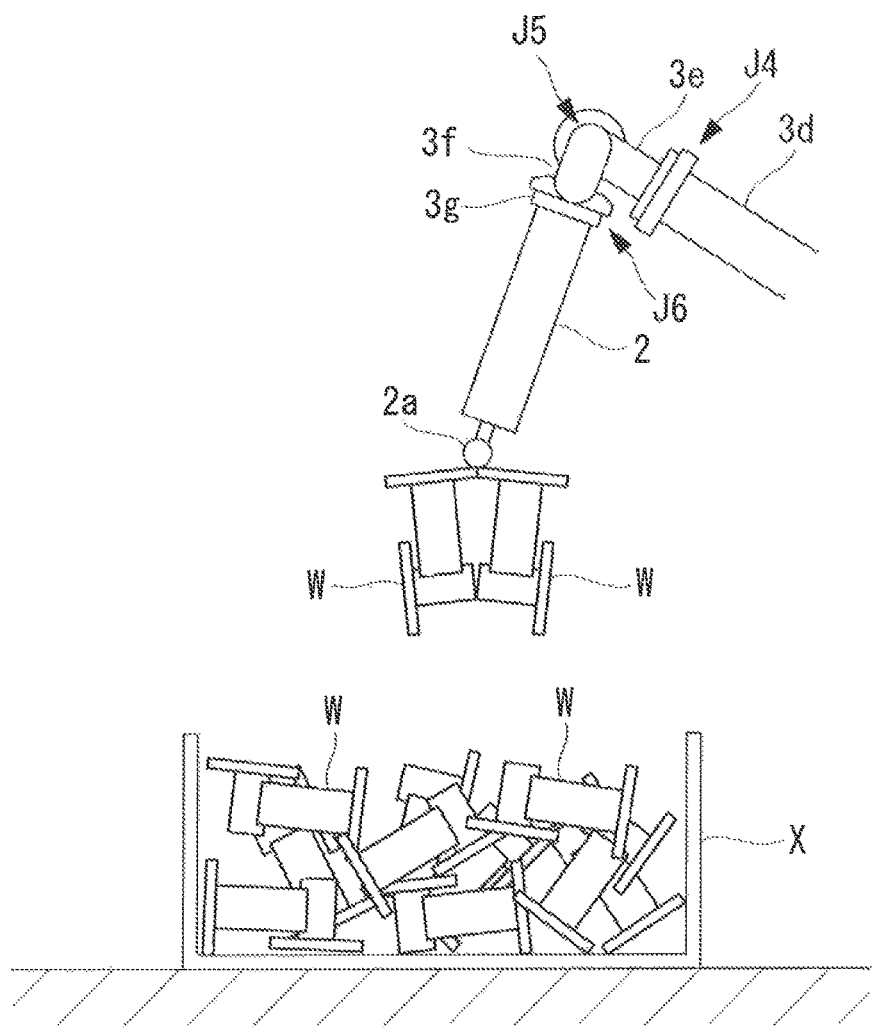
FIG. 7 is a view showing another state in which two workpieces are picked up by the electromagnetic hand.
Figure 8:
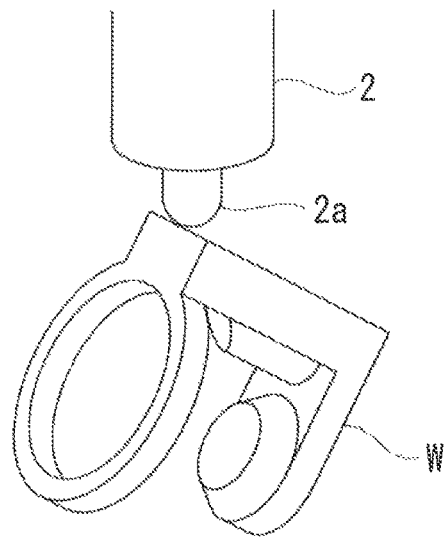
FIG. 8 is a view showing a workpiece having another shape picked up by the electromagnetic hand in the picking system of FIG. 1.
Figure 9:
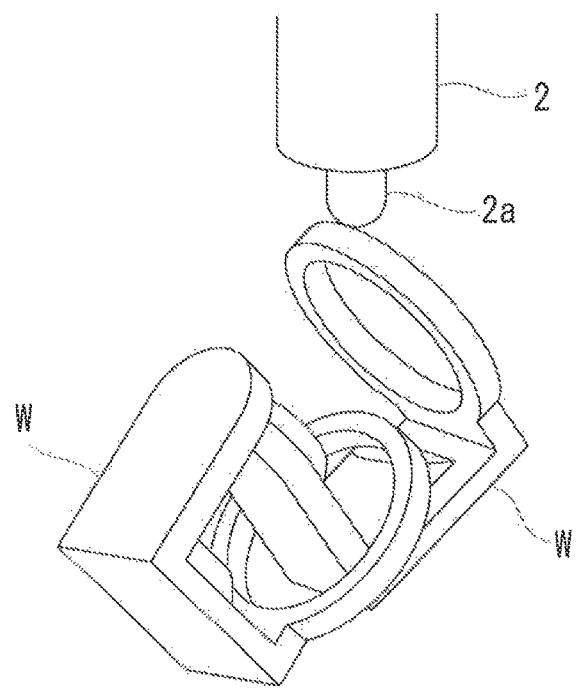
FIG. 9 is a view showing a state in which the two workpieces of FIG. 8 are picked up entangled with each other.

In this case, the magnitude of the first magnetic force M1 is set such that one workpiece W can be suspended, and such that two workpieces W cannot be suspended. The state in which two workpieces W are suspended as shown in FIG. 6, FIG. 7 and FIG. 9 is not generated, and hence, there are two possibilities: either one workpiece W is suspended as shown in FIG. 5 and FIG. 8 or no workpiece W is suspended. Therefore, it can be confirmed that one workpiece W is picked up simply by detecting that there is a workpiece W by the pickup determination section 4.

That is, by the sensor 6 of the pickup determination section 4, it is determined whether or not one workpiece W is detected at the pickup determination position (determination step S5). When the one workpiece W is detected at the pickup determination position, the magnetic force control section 5b increases the magnetic force of the electromagnetic hand 2 to the second magnetic force M2 (second magnetic force setting step S6). On the other hand, when one workpiece W is not detected at the pickup determination position, the process returns to step S1, and the magnetic attraction of the workpiece W is resumed.

Since the second magnetic force M2 is larger than the first magnetic force M1, the workpiece W, which is magnetically attracted to the magnetic attraction section 2a, is maintained in a more strongly attracted state.

After step S6, by the robot control section 5a, the robot 3 is operated to move to the position at which the workpiece W is detached from the electromagnetic hand 2 (step S7). Since the workpiece W is strongly attracted to the magnetic attraction section 2a, the workpiece W does not fall from the magnetic attraction section 2a during the movement.

After the robot 3 is moved to the workpiece detachment position, the robot control section 5a stops the attraction command signal, and thereby, the magnetic force of the electromagnetic hand 2 is removed, so that the workpiece W is detached from the electromagnetic hand 2 (step S8). Then, it is determined whether or not a required number of workpieces W are picked up (step S9). When it is determined that the required number of workpieces W are not picked up, the process from step S1 is repeated.

In this way, in the picking system 1 and the picking method according to the present embodiment, before it is determined by the pickup determination section 4 that the magnetic attraction is performed, the magnetic force control section 5b sets the magnetic force of the electromagnetic hand 2 to the magnitude of the first magnetic force M1 by which one workpiece W can be suspended, and by which two workpieces W cannot be suspended. Thereby, it is prevented that two or more workpieces W are erroneously picked up at the same time. As a result, it is possible to prevent the problems which will occur in the subsequent step when two or more workpieces W are picked up.

That is, the subsequent step of the picking method is performed such that the shape of the workpiece W detached from the electromagnetic hand 2 is recognized by the bulk sensor 8, such that, by using a hand attached to another robot or by using a newly exchanged hand attached to the robot used in the preceding steps, the outer surface of the workpiece W is temporarily gripped for handling, such as inversion, of the workpiece W, and then, the workpiece W is gripped at a correct position, and such that, in this state, the grip shift of the workpiece W is detected, and then, the workpiece W is aligned on a palette.

Therefore, when two workpieces W, which are picked up at the same time, are detached from the electromagnetic hand 2 in the state where the workpieces W are close to each other, or the state where the workpieces W overlap each other, it is difficult to perform the operation of temporarily gripping and holding the outer surface of the workpiece W by the electromagnetic hand 2. However, with the picking system 1 and the picking method according to the present embodiment, two or more workpieces W are not picked up at the same time. Therefore, the present embodiment has the advantage that the outer surface of the workpiece W detached from the electromagnetic hand 2 can be easily gripped by the electromagnetic hand 2.

Further, in the present embodiment, after it is confirmed that one workpiece W is magnetically attracted, the magnetic force of the electromagnetic hand 2 is increased to the second magnetic force M2, and thereby, the workpiece W is magnetically attracted firmly to the electromagnetic hand 2, and thereby, it can be prevented that the workpiece W is detached from the electromagnetic hand 2 during the movement of the workpiece W.

It should be noted that, in the present embodiment, the sensor 6 arranged at the upper portion of the mesh cage X is used as the pickup determination section 4 for determining whether or not the workpiece W is magnetically attracted to the electromagnetic hand 2 successively. Instead, the magnetic attraction of the workpiece W may also be determined by the motor current of each of the axes J1, J2, J3, J4, J5 and J6 of the robot 3.

That is, in the present embodiment, the second axis J2, the third axis J3, and the fifth axis J5 are axes for operating the first arm 3c, the second arm 3d, or the wrist section 3f in the gravity direction, and hence, the motor current is changed on the basis of whether or not the workpiece W is magnetically attracted to the electromagnetic hand 2.

Therefore, when the motor current of one of the axes J2, J3 and J5 exceeds a predetermined threshold value, it is determined that the workpiece W is magnetically attracted to the electromagnetic hand 2.

Further, in the present embodiment, the magnetic attraction of the workpiece W is performed by using the first magnetic force M1 by which one workpiece W can be suspended, and by which two workpieces W cannot be suspended, and thereby, two or more workpieces W are not picked up at the same time. Instead, the determination of the magnetic attracted of the workpiece W may also be performed in such a manner that the magnetic force, by which two or more workpieces W can be suspended, is set as the first magnetic force M1, and that whether one workpiece W or two or more workpieces W are attracted may also be determined by using the motor current of each of the axes J2, J3 and J5.

Figure 10:
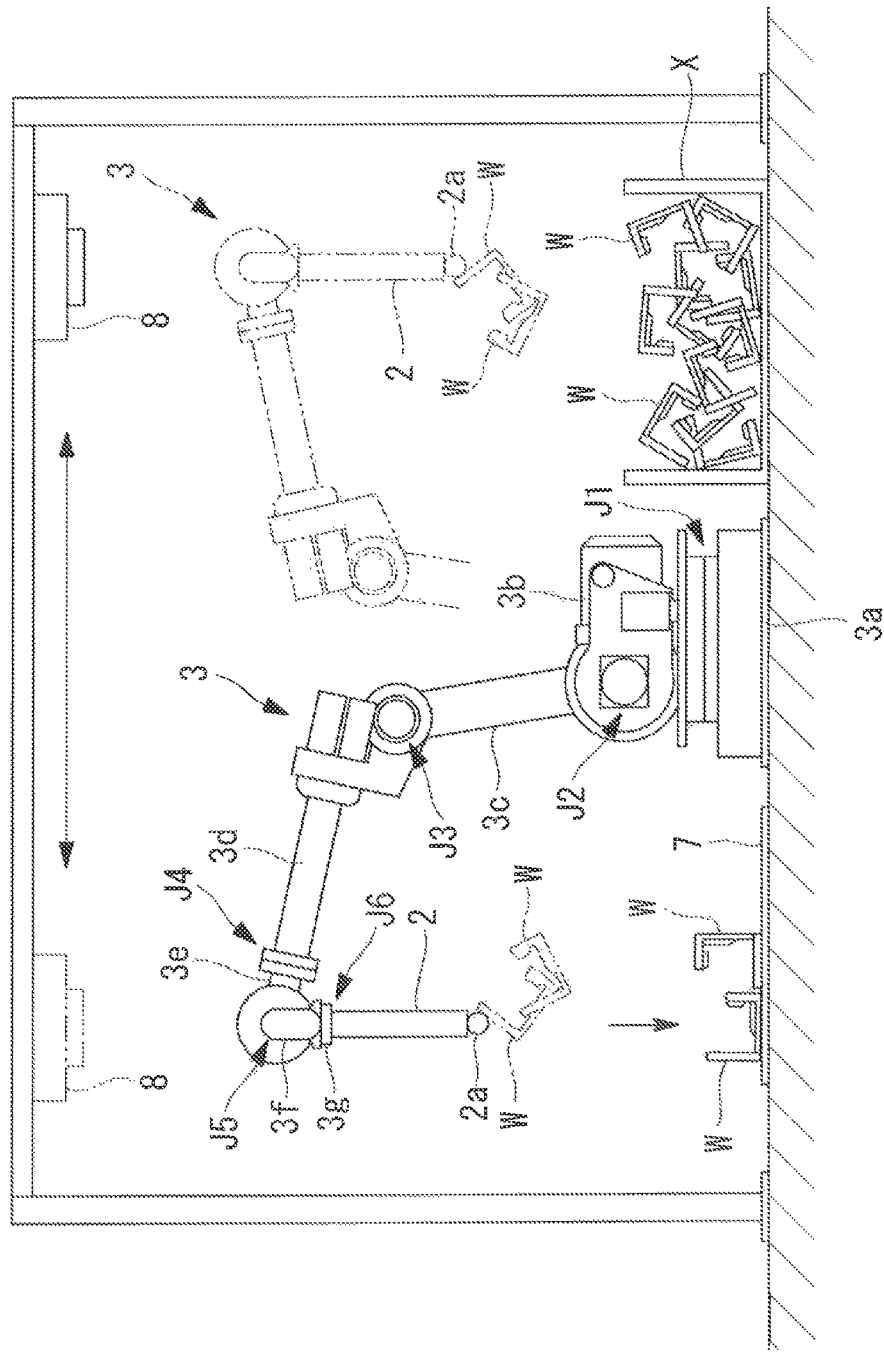
FIG. 10 is a view showing a modification of the picking system of FIG. 1.

In this case, as shown in FIG. 10, a work table with buffer material (buffer stage) 7 is provided in the operation range of the robot 3, and then, two or more suspended workpieces W are arranges above the work table with buffer material 7. Then, the magnetic force of the electromagnetic hand 2 is removed, and thereby, the workpieces W are dropped. At this time, the desirable state of the workpieces W is maintained by the buffer action of the work table with buffer material 7, and also, the entangled workpieces W, as shown in FIG. 9, are unraveled and separated from each other by the shock of dropping.

Whether or not the workpieces W are separated from each other can be confirmed in such a manner that the bulk sensor 8 arranged at the upper portion of the mesh cage X is moved to a position above the work table with buffer material 7, and then, the shapes of the workpieces W placed on the work table with buffer material 7 is recognized by the bulk sensor 8. When the workpieces W are not separated from each other, the magnetic attraction, suspension and dropping by the electromagnetic hand 2, and the confirmation by the bulk sensor 8 are repeated so that the workpieces W are separated from each other.

From the above-described embodiment, the following invention is derived.

An aspect of the present invention provides a bulk workpiece picking system including: a robot which is provided with an electromagnetic hand capable of magnetically attracting a metal workpiece; a determination section which determines whether or not the workpiece is magnetically attracted to the electromagnetic hand; and a magnetic force control section which controls the magnetic force of the electromagnetic hand, the magnetic force control section being configured such that, before it is determined by the determination section that the magnetic attraction is performed, the magnetic force control section sets a magnitude of the magnetic force of the electromagnetic hand so that the electromagnetic hand can suspend one workpiece and cannot suspend two workpieces, and then, after it is determined by the determination section that the magnetic attraction is performed, the magnetic force control section increases the magnetic force of the electromagnetic hand.

According to the above-described aspect, the robot is operated so that the electromagnetic hand becomes close to a bulk workpiece, and then, the electromagnetic hand is operated to enable the workpiece to be magnetically attracted to the electromagnetic hand. In this stage, the control section sets the magnitude of the magnetic force of the electromagnetic hand so that the electromagnetic hand can suspend one workpiece and cannot suspend two workpieces. Therefore, in the case where, when the robot is operated to lift the workpieces, two or more workpieces are magnetically attracted to the electromagnetic hand, the workpiece is detached from the electromagnetic hand while the workpieces are lifted, and thereby, the one workpiece is suspended or no workpiece is suspended.

In this state, whether or not the magnetic attraction is successfully performed is determined by the determination section. When it is determined that one workpiece is suspended by the electromagnetic hand, the control section increases the magnetic force of the electromagnetic hand. Thereby, the one workpiece magnetically attracted to the electromagnetic hand is held so as not to be detached from the electromagnetic hand.

That is, one workpiece can be surely taken out from the plurality of bulk workpieces, so that the surface of the workpiece can be easily gripped in the subsequent process.

According to the above-described aspect, the determination section is provided with a sensor which detects the presence or absence of the workpiece at the time when the robot arranges the electromagnetic hand at the position at which the workpiece is suspended by the electromagnetic hand. When the presence of the workpiece is detected by the sensor, the determination section may determine that the workpiece is magnetically attracted to the electromagnetic hand.

In this way, the magnetic force of the electromagnetic hand is set so that the electromagnetic hand can suspend only one workpiece, and thereby, in the state where the workpiece is magnetically attracted to the electromagnetic hand, the presence or absence of the workpiece is detected by the sensor. As a result, the determination of the presence or absence of the workpiece can be easily performed.

Further, according to the above-described aspect, the robot is provided with one or more axes about which the robot can be operated in the vertical direction. Further, when a current of a motor, which operates the robot about one of the axes of the robot, exceeds a predetermined threshold value in the state where the robot arranges the electromagnetic hand at the position at which the workpiece is suspended by the electromagnetic hand, the determination section determines that the workpiece is magnetically attracted to the electromagnetic hand.

In this way, in the state where the workpiece is suspended by the electromagnetic hand, the current, which is larger than that in the state where the workpiece is not suspended by the electromagnetic hand, flows through the motor of the axis, about which the robot, provided with the electromagnetic hand, can be operated in the gravity direction. Therefore, the determination of the presence or absence of the workpiece can be easily performed by determining whether or not the current exceeds the predetermined threshold value.

Further, according to another aspect of the present invention, a bulk workpiece picking system is configured by including: a robot which is provided with an electromagnetic hand capable of magnetically attracting a metal workpiece; a buffer stage which is arranged in an operation range of the robot; a determination section which determines whether or not two or more workpieces are magnetically attracted to the electromagnetic hand; and a control section which controls the robot, and is configured such that, when it is determined by the determination section that two or more workpieces are magnetically attracted to the electromagnetic hand, the control section controls the robot so that the workpieces are arranged above the buffer stage, and then, the control section reduces the magnetic force of the electromagnetic hand to lower the workpieces toward the buffer stage.

According to the above-described aspect, the bulk workpiece picking system is configured such that the robot is operated so that the electromagnetic hand is made close to the bulk workpiece, and such that, in the state where the electromagnetic hand is operated and magnetically attracts the workpieces, when it is determined, by the determination section, that two or more workpieces are magnetically attracted to the electromagnetic hand, the control section operates the robot so that the workpieces are arranged above the buffer stage, and then, the control section reduces the magnetic force of the electromagnetic hand, to lower the workpieces toward the buffer stage.

Thereby, two or more workpieces magnetically attracted to the electromagnetic hand can be separated from each other on the buffer stage, and thereby, the desirable state of the workpieces is maintained by the buffer action of the buffer stage. Further, even in the case where two or more workpieces, magnetically attracted to the electromagnetic hand, are entangled with each other, the workpieces can be separated from each other by the shock of dropping. As a result, each of the workpieces separated from each other can be magnetically attracted to the electromagnetic hand, and thereby the surface of the workpiece can be easily gripped in the subsequent process.

Further, another aspect of the present invention provides a picking method for taking out, by magnetic attraction, a single workpiece from a plurality of metal workpieces placed in bulk, the picking method including: a first magnetic force setting step of setting a magnitude of magnetic force of an electromagnetic hand so that the electromagnetic hand can suspend one workpiece and cannot suspend two workpieces; an attraction step of magnetically attracting the workpiece to the electromagnetic hand which generates the magnetic force set in the first magnetic force setting step; a determination step of determining whether or not the workpiece is magnetically attracted to the electromagnetic hand successfully by the attraction step; and a second magnetic force setting step of increasing the magnetic force of the electromagnetic hand when it is determined by the determination step that the workpiece is magnetically attracted to the electromagnetic hand.

REFERENCE SIGNS LIST

1 Picking system
2 Electromagnetic hand
3 Robot
4 Pickup determination section (determination section)
5 Control section
5b Magnetic force control section
6 Sensor
7 Work table with buffer material (buffer stage)
S2 First magnetic force setting step
S3 Attraction step
S5 Determination step
S6 Second magnetic force setting step
W Workpiece

The invention claimed is:
1. A bulk workpiece picking system comprising:
a robot which is provided with an electromagnetic hand configured to magnetically attract a metal workpiece;
a detector configured to determine whether or not a magnetic attraction in which the metal workpiece is magnetically attracted to the electromagnetic hand is performed by detecting the magnetic attraction; and a controller configured to control a magnetic force of the electromagnetic hand, wherein, before it is determined by the detector that the magnetic attraction is performed, the controller sets a magnitude of the magnetic force of the electromagnetic hand so that the electromagnetic hand can suspend one metal workpiece and cannot suspend two metal workpieces, and then, after it is determined by the detector that the magnetic attraction is performed, the controller increases the magnetic force of the electromagnetic hand.

2. The bulk workpiece picking system according to claim 1, wherein: the detector is provided with a sensor which detects the presence or absence of the metal workpiece at the time when the robot arranges the electromagnetic hand at the position at which the metal workpiece is suspended by the electromagnetic hand; and when the presence of the metal workpiece is detected by the sensor, the detector determines that the magnetic attraction is performed.

3. The bulk workpiece picking system according to claim 1, wherein:

the robot is provided with one or more axes about which the robot can be operated in the vertical direction; and when a current of a motor, which operates the robot about one of the axes of the robot, exceeds a predetermined threshold value in a state where the robot arranges the electromagnetic hand at the position at which the metal workpiece is suspended by the electromagnetic hand, the detector determines that the magnetic attraction is performed.

4. A picking method in a bulk workpiece picking system including: a robot which is provided with an electromagnetic hand configured to magnetically attract a metal workpiece; a detector configured to determine whether or not a magnetic attraction in which the metal workpiece is magnetically attracted to the electromagnetic hand is performed by detecting the magnetic attraction; and a controller configured to control a magnetic force of the electromagnetic hand, the picking method comprising:

setting, by the controller, a magnitude of magnetic force of the electromagnetic hand so that the electromagnetic hand can suspend one workpiece and cannot suspend two metal workpieces;

magnetically attracting, by the robot, the metal workpiece to the electromagnetic hand;

determining, by the detector, whether or not the magnetic attraction is performed; and increasing, by the controller, the magnetic force of the electromagnetic hand when it is determined by the detector that the magnetic attraction is performed.

* * * * *